Dec. 2, 1952            L. L. MALLARD            2,620,008
DEFORMABLE MEANS FOR INTERLOCKING MACHINE ELEMENTS
Filed Dec. 7, 1948
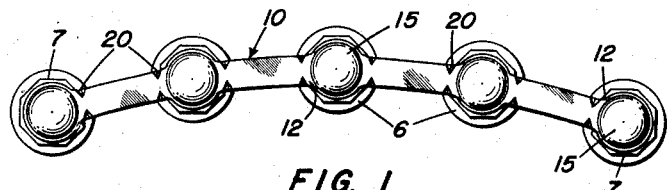
*FIG. 1*
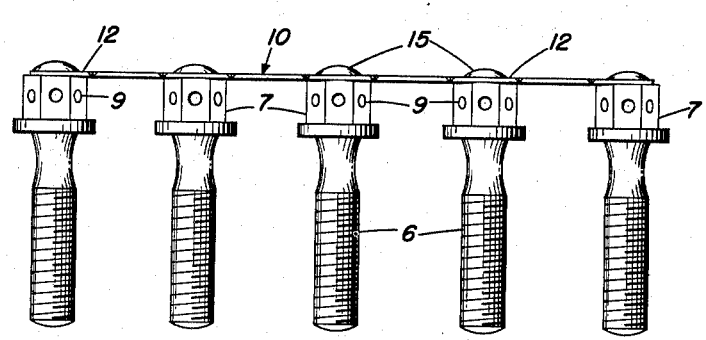
*FIG. 2*
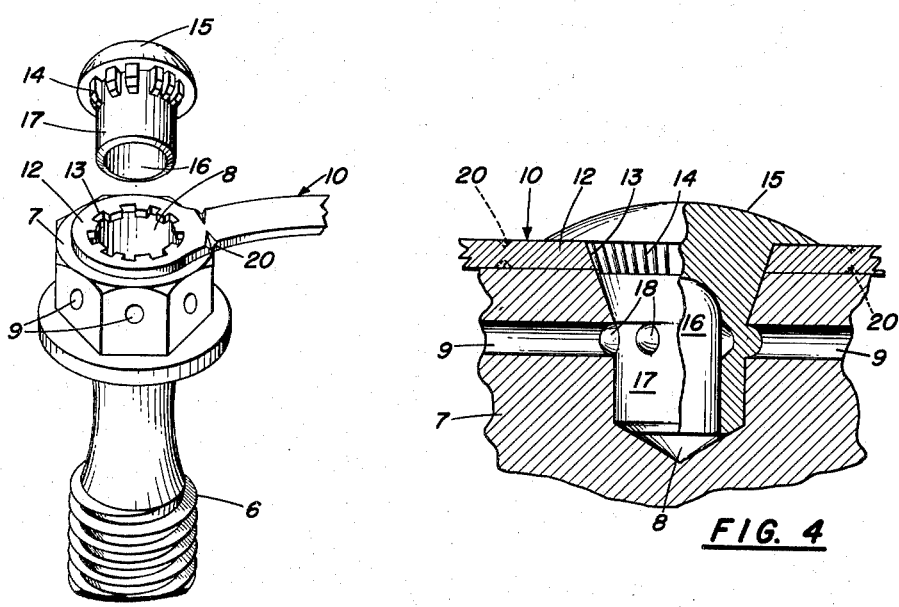
*FIG. 3*            *FIG. 4*
INVENTOR.
LOGAN L. MALLARD
BY
*D. E. Snyder*
Attorney

UNITED STATES PATENT OFFICE 2,620,008

DEFORMABLE MEANS FOR INTERLOCKING MACHINE ELEMENTS

Logan L. Mallard, Norfolk, Va.

Application December 7, 1948, Serial No. 64,002

5 Claims. (Cl. 151—70)

(Granted under the act of March 3, 1883, as amended April 30, 1928; 370 O. G. 757)

This invention relates to means for interlocking relatively movable elements through use of devices that are deformable under pressure.

More particularly, the present invention is concerned with deformation of an interlocking element by fluid pressure, preferably created by explosive action. In its preferred form the element comprises a relatively soft cap or rivet having a cavity for reception either of fluid under pressure or of an expansible medium. The latter term is intended to include explosive substances.

It is the primary object of this invention to devise an improved interlock of the above character for holding a nut or a bolt securely in its tightened or set position. This object further contemplates the interlocking of a plurality of bolts or nuts by utilizing individual elements affixed to them and to a common relatively rigid tie member.

It is a further important object to devise a substitute arrangement for a wiring system designed to tie a plurality of bolt heads or the like together by lacing the wire through holes in the nuts or the bolt heads to prevent them from turning. The wiring system allows a certain amount of oscillation—sometimes as much as 15 or 20 degrees—from the set or tightened position of each bolt or nut, whereas the present arrangement requires each element to remain exactly in its preset position. This object preferably is accomplished by setting a plurality of rivets, having serrations, into a strap or yoke having a plurality of serrated holes complemental to the rivets. Another object is to so construct the strap or yoke that it may be readily broken apart to permit reclamation of the nuts or bolts.

The foregoing and other objects of the invention should clearly appear from a study of the following description when taken in conjunction with the accompanying drawing, wherein:

Fig. 1 is a top plan view of a series of bolts interconnected by a strap embodying the present invention;

Fig. 2 is a side elevational view of the arrangement shown in Fig. 1;

Fig. 3 represents an exploded and enlarged view of one form of a bolt and rivet subcombination of the invention seen in Figs. 1 and 2; and Fig. 4 is an enlarged view, chiefly in section, of a modified form of an exploded rivet with portions thereof bulged into a bolt.

With continued reference to the drawing, there is shown in Figs. 1 and 2 a series of studs 6 suitable, for example, as hold down bolts for an engine cylinder. They have heads 7 that are conventional except that each has a central cavity 8 reamed or otherwise formed therein, each cavity being intersected by a plurality of radial holes 9. These holes formerly were used for wiring the set of heads together, but they serve a different purpose here, as will be seen later.

After the bolts have been inserted in a predetermined pattern of tapped holes in an engine or other machine part (not shown) and thoroughly tightened, a suitably shaped metal strap 10, having a plurality of circular enlargements 12, spaced to fit the pattern, is laid upon the bolt heads so that holes 13 in the enlargements are aligned with the cavities 8. Each hole is preferably frustro-conical to match the upper end of the cavity, and is also serrated, as shown, to snugly receive the serrations 14 of a deformable rivet 15, such as shown for example in Figures 3 and 4, and prevent relative rotation of the rivet.

Each rivet has a cavity 16 within a relatively thin tubular wall 17 that is intended to receive an explosive material for expansion against the wall to deform the latter and bulge it at points 18 into the inner ends of the holes 9. In this manner the rivet locks the bolt against loosening even to the extent of a few degrees, and the rivet is prevented from working itself out axially from the bolt head.

The explosive material may consist of an inserted trinitrotoluol paste or a plug of any other suitable chemical substance pushed into the cavity 16. To assemble the locking means, the yoke 10 is laid in position and the rivets are pressed into place or, the rivets may be secured to the yoke to form a preassembled unit, and then it is necessary only to tap the rivet heads in succession with a hammer to complete the assembly by exploding the rivets. Or, explosion may be caused by heating the rivet heads through application of a hot element. It also is possible to utilize special rivets that may be exploded simultaneously by radio through remote control.

The rivets might take the form of closed chambers and be caused to bulge by pressure. For example, the distortion could be caused by filling each chamber with a gas and then expanding it through heat application. Or, the rivets could have outward openings for connection to a source of hydraulic pressure.

Preferably, the strap 10 has a plurality of indentations 20, arranged in pairs adjacent the enlargements 12 so that the strap may readily be broken into sections to permit removal of the bolts when making machine repairs. If it is desired to salvage the bolts, the exploded rivets may be removed by drilling their bodies out of the cavities 8 and thereafter punching the bulged portions 18 inwardly into the cavities from the holes with any suitable tool insertible through the holes.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed is:

1. In a machine structure, the combination of a plurality of bolts having exposed heads that are provided with axial cavities intersected by radial holes, a flat strap conforming in longitudinal shape to the pattern of the bolt heads, rivets non-rotatably carried by said strap in positions for insertion in said cavities, said rivets having deformable portions bulged into said holes.

2. In a device for interlocking a plurality of elements having heads provided with axial cavities, a perforated rigid yoke on top of said elements with the perforations in alignment with the cavities in said element heads, rivets having shanks adapted to be expanded into a tight fit with said element head cavities, said shanks being threaded through said perforations, and interengaging means on the rivets and at the marginal edges of the perforations effecting a non-rotatable engagement between the rivets and yoke.

3. A lock to prevent relative rotation between a bolt and work comprising a bolt having a head that is provided with an axial cavity, a substantially rigid strap having a non-circular aperture placed over and in alignment with said cavity and held from rotation relative to the work, and a rivet having a shank threaded through said aperture with its lower end expanded into tight engagement with said cavity, and the portion of the shank immediately below said rivet's head being of a shape complementary to said aperture to prevent relative rotation between said strap and rivet when in mating engagement.

4. In combination, a plurality of bolts having exposed heads each provided with an axial cavity intersected by a radial hole, a substantially rigid strap with apertures conforming in longitudinal shape to the pattern of the bolt heads, said strap having weak points adjacent said apertures to facilitate the breaking of the straps between said apertures, rivets non-rotatably carried by said strap, there being one rivet for each bolt head arranged in aligned position with the cavity of its associated bolt head, and each rivet having a deformable portion bulged into the cavity and hole of its associated bolt head.

5. The method of securing a plurality of bolt heads together to prevent angular rotation with respect to each other, comprising providing a non-cylindrical cavity axially in each head; placing a perforated rigid yoke over the tops of the bolt heads with the perforations in alignment with the cavities in said bolt heads; inserting fastening elements in non-rotatable engagement through said perforations and into the cavities in the bolt heads, and expanding said fastening elements within the cavities.

LOGAN L. MALLARD.

REFERENCES CITED

The following references are of record in the file of this patent:

UNITED STATES PATENTS

| Number | Name | Date |
| --- | --- | --- |
| 821,297 | Kohler | May 22, 1906 |
| 1,286,381 | Mead | Dec. 3, 1918 |
| 1,930,187 | Abronski | Oct. 10, 1933 |
| 2,074,379 | Everett | Mar. 23, 1937 |
| 2,385,777 | Ebert | Oct. 2, 1945 |
| 2,387,742 | Burrows | Oct. 30, 1945 |
| 2,423,918 | Wohlhieter | July 15, 1947 |
| 2,542,375 | Torresen | Feb. 20, 1951 |